United States Patent
Tang et al.

(10) Patent No.: US 10,173,620 B2
(45) Date of Patent: Jan. 8, 2019

(54) PROTECTION DEVICE FOR VEHICLE CHASSIS

(71) Applicant: BEIQI FOTON MOTOR CO., LTD., Beijing (CN)

(72) Inventors: Lainian Tang, Beijing (CN); Liyan Ding, Beijing (CN); Changyu Tan, Beijing (CN)

(73) Assignee: BEIQI FOTON MOTOR CO., LTD., Beijing (CN)

( * ) Notice: Subject to any disclaimer, the term of this patent is extended or adjusted under 35 U.S.C. 154(b) by 295 days.

(21) Appl. No.: 15/108,835

(22) PCT Filed: Sep. 23, 2014

(86) PCT No.: PCT/CN2014/087215
§ 371 (c)(1),
(2) Date: Jun. 29, 2016

(87) PCT Pub. No.: WO2015/139438
PCT Pub. Date: Sep. 24, 2015

(65) Prior Publication Data
US 2017/0057442 A1    Mar. 2, 2017

(30) Foreign Application Priority Data
Mar. 21, 2014 (CN) .......................... 2014 1 0109260

(51) Int. Cl.
*B60R 19/56* (2006.01)
*B60R 19/18* (2006.01)
*B60R 19/24* (2006.01)

(52) U.S. Cl.
CPC .............. *B60R 19/56* (2013.01); *B60R 19/18* (2013.01); *B60R 19/24* (2013.01); *B60R 2019/1826* (2013.01); *B60Y 2306/01* (2013.01)

(58) Field of Classification Search
CPC ......... B60R 19/56; B60R 19/24; B60R 19/18; B60R 2019/1826; B60Y 2306/01
See application file for complete search history.

(56) References Cited

U.S. PATENT DOCUMENTS

| 6,652,010 B1 | 11/2003 | Huddle et al. |
| 2017/0072886 A1* | 3/2017 | Wylezinski ............. B60R 19/56 |

FOREIGN PATENT DOCUMENTS

| CN | 202271943 U | 6/2012 |
| CN | 203047134 U | 7/2013 |
| CN | 203093964 U | 7/2013 |

OTHER PUBLICATIONS

Application No. PCT/CN2014/087215 English translation of the International Search Report & Written Opinion dated Dec. 24, 2014, 7 pages.

* cited by examiner

Primary Examiner — D Glenn Dayoan
Assistant Examiner — Melissa A Black
(74) Attorney, Agent, or Firm — Lathrop Gage LLP

(57) ABSTRACT

A protection device (100) for a vehicle chassis includes a first flange plate (211) obliquely disposed to a rear side of a beam (10); a second flange plate (221) having a front end face abuts against a rear end face of the first flange plate (211), and connected to the first flange plate (211) through a bolt; a left side plate (222) and a right side plate (223) provided in perpendicular to a rear end face of the second flange plate (221); a connecting plate (224) having a left end connected to the left side plate (222) and a right end connected to the right side plate (223), and arranged close to front ends of the left side plate (222) and the right side plate (223); and a bearing member provided to the rear end face of the second flange plate (221) and located between the left side plate (222) and the right side plate (223).

10 Claims, 4 Drawing Sheets

PROTECTION DEVICE FOR VEHICLE CHASSIS

CROSS-REFERENCE TO RELATED APPLICATIONS

This U.S. application claims priority under 35 U.S.C 371 to, and is a U.S. National Phase application of, the International Patent Application No. PCT/CN2014/087215, filed Sep. 23, 2014, which claims the benefit of prior Chinese Application No. 201410109260.2 filed Mar. 21, 2014. The entire contents of the above-mentioned patent applications are incorporated by reference as part of the disclosure of this U.S. application.

FIELD

The present disclosure relates to a technical field of vehicles, and more particularly to a protection device for a vehicle chassis.

BACKGROUND

A chassis of a commercial vehicle must be mounted with a front underrun protection device in conformity with laws and regulations that can bear a large load. However, an existing front underrun protection device cannot bear multidirectional complex loads, and is inconvenient to mount.

SUMMARY

Embodiments of the present disclosure seek to solve at least one of the problems existing in the related art to at least some extent. Accordingly, an objective of the present disclosure provides a protection device for a vehicle chassis, and the protection device can reasonably bear multidirectional complex loads and is convenient to use.

The protection device according to embodiments of the present disclosure includes a beam; and a base assembly having a beam connecting base and a frame connecting base. The beam connecting base is connected to the beam and includes a first flange plate obliquely disposed to a rear side of the beam. The frame connecting base includes a second flange plate, in which a front end face of the second flange plate abuts against a rear end face of the first flange plate, and the second flange plate is connected to the first flange plate through a bolt; a left side plate and a right side plate, in which the left side plate and the right side plate are spaced apart and disposed to a rear end face of the second flange plate and in perpendicular to the rear end face of the second flange plate, and respectively provided with a corresponding mounting hole; a connecting plate arranged close to front ends of the left side plate and the right side plate, in which a left end of the connecting plate is connected to the left side plate, and a right end of the connecting plate is connected to the right side plate; and a bearing member provided to the rear end face of the second flange plate and located between the left side plate and the right side plate.

The protection device according to the present disclosure can meet the collision avoidance requirement of vehicles by providing the frame connecting base. The protection device may reasonably decompose external forces from any directions, such as front, up front, down front, left and right directions. The protection device may bear multidirectional forces and transfer all the multidirectional forces to a frame in case of vehicle accidents, so as to meet the comprehensive force bearing requirement in case of vehicle traffic collision.

At the same time, the frame connecting base is compact in structure and convenient to mount, thus saving design space and improving safety of the vehicle.

Furthermore, the protection device according to the embodiments of the present disclosure may further have the following additional technical features.

According to one embodiment of the present disclosure, the front end face of the second flange plate has a protruding positioning pin, and the rear end face of the first flange plate is provided with a recessed portion matching the positioning pin.

According to one embodiment of the present disclosure, the connecting plate includes: a body portion; and a left flanging and a right flanging, in which the left flanging is bent backwards and connected to the left side plate, and the right flanging is bent backwards and connected to the right side plate.

According to one embodiment of the present disclosure, the bearing member has a U-shaped cross section, and an opening end connected to the rear end face of the second flange plate.

According to one embodiment of the present disclosure, the beam connecting base further includes: a left upright plate and a right upright plate, in which the left upright plate and the right upright plate are spaced apart from each other, and disposed to a front end face of the first flange plate and in perpendicular to the front end face of the first flange plate; and a reinforcing grooved plate, in which a rear end of the grooved plate is connected to the left upright plate and the right upright plate, and a front end of the grooved plate is provided with a mounting groove for mounting the beam.

According to one embodiment of the present disclosure, a plurality of base assemblies are provided.

According to one embodiment of the present disclosure, a hook is provided at respective upper ends of the left upright plate and the right upright plate and configured to match an upper end of the second flange plate.

According to one embodiment of the present disclosure, both of the left upright plate and the right upright plate are provided with at least two hooks.

According to one embodiment of the present disclosure, the beam includes: a first channel steel, a second channel steel, and a third channel steel. An opening of the first channel steel corresponds to and is welded to an opening of the second channel steel, an opening end of the third channel steel is welded to an internal bottom wall of the first channel steel, and an external bottom wall of the third channel steel is welded to an internal bottom wall of the second channel steel.

According to one embodiment of the present disclosure, an opening of the third channel steel gradually enlarges upwards from a bottom portion thereof.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

A direction pointed by an arrow Z in FIG. 4 and FIG. 5 is defined as the front direction.

DETAILED DESCRIPTION

Figure 1:
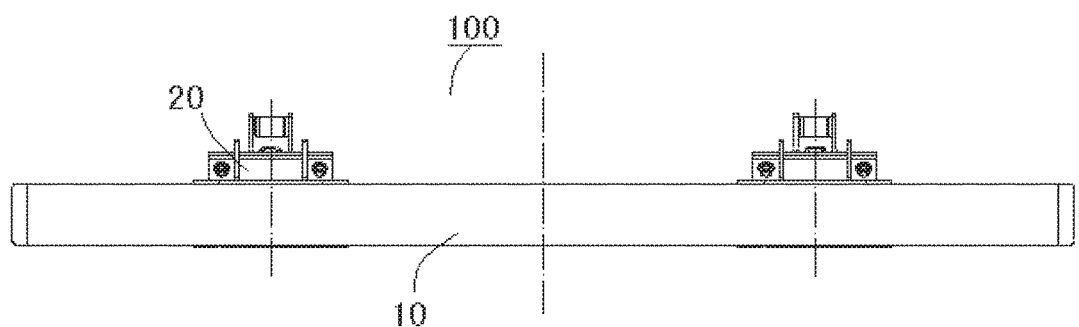
FIG. 1 is a front view of a protection device for a vehicle chassis according to one embodiment of the present disclosure.
Figure 2:
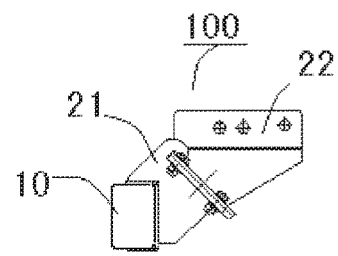
FIG. 2 is a side view of a protection device for a vehicle chassis according to one embodiment of the present disclosure.
Figure 3:
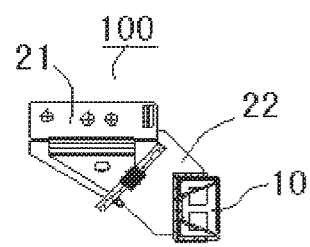
FIG. 3 is a sectional view of a protection device for a vehicle chassis according to one embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance. Thus, the feature defined with "first" and "second" may include one or more this feature. In the description of the present disclosure, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

As shown in FIG. 1 to FIG. 10, a protection device 100 for a vehicle chassis according to embodiments of the present disclosure includes a beam 10 and a base assembly 20.

Specifically, the base assembly 20 may include a beam connecting base 21 and a frame connecting base 22, the beam connecting base 21 is connected to the beam 10 that may be a front underrun beam of a commercial vehicle, and the beam connecting base 21 includes a first flange plate 211 obliquely disposed to a rear side of the beam 10.

The frame connecting base 22 includes a second flange plate 221, a left side plate 222, a right side plate 223, a connecting plate 224 and a bearing member 225.

A front end face of the second flange plate 221 abuts against a rear end face of the first flange plate 211, and the second flange plate 221 is connected to the first flange plate 211 through a bolt 31. In other words, the first flange plate 211 abuts against the second flange plate 221 in a corresponding way, each of the first flange plate 211 and the second flange plate 221 is provided with a flange hole, and the bolt penetrate the flange holes to fix the first flange plate 211 and the second flange plate 221, so as to fix the beam connecting base 21 and the frame connecting base 22.

The left side plate 222 and the right side plate 223 are spaced apart and disposed to a rear end face of the second flange plate 221, and the left side plate 222 and the right side plate 223 are perpendicular to the rear end face of the second flange plate 221. The left side plate 222 and the right side plate 223 are respectively provided with a corresponding mounting hole 32, that is, the left side plate 222 is provided with a first mounting hole and the right side plate 223 is provided with a second mounting hole corresponding to the first mounting hole, and the left side plate 222 and the right side plate 223 may be fixed to a frame connecting plate 300 by a mounting bolt (not shown) penetrating the mounting holes 32. The protection device 100 can be effectively connected to the frame connecting plate 300 by the left side plate 222 and the right side plate 223, and at the same time, the left side plate 222 and the right side plate 223 may bear partial external forces applied sideways.

A left end of the connecting plate 224 may be connected to the left side plate 222, and a right end thereof may be connected to the right side plate 223. The connecting plate 224 is arranged close to front ends of the left side plate 222 and the right side plate 223, and may abut against a front end of the frame connecting plate 300, so as to transfer component forces of the external forces to the frame connecting plate 300 effectively.

The bearing member 225 may be provided to the rear end face of the second flange plate 221 and located between the left side plate 222 and the right side plate 223. The bearing member 225 may abut against the frame connecting plate 300 at the upper and lower sides, to bear upward and downward forces.

It should be understood that the second flange plate 221, the left side plate 222, the right side plate 223 and the bearing member 225 may be all made from steel plates, and various components to be connected may be welded with one another.

The protection device 100 according to the present disclosure can meet the collision avoidance requirement of vehicles by providing the frame connecting base 22. The protection device 100 may reasonably decompose the external forces from any directions, such as front, up front, down front, left and right directions. The protection device 100 may bear multidirectional forces and transfer all the multidirectional forces to a frame in case of vehicle accidents, so as to meet the comprehensive force bearing requirement in case of vehicle traffic collision. At the same time, the frame connecting base 22 is compact in structure and convenient to mount, thus saving design space and improving safety of the vehicle.

Figure 5:
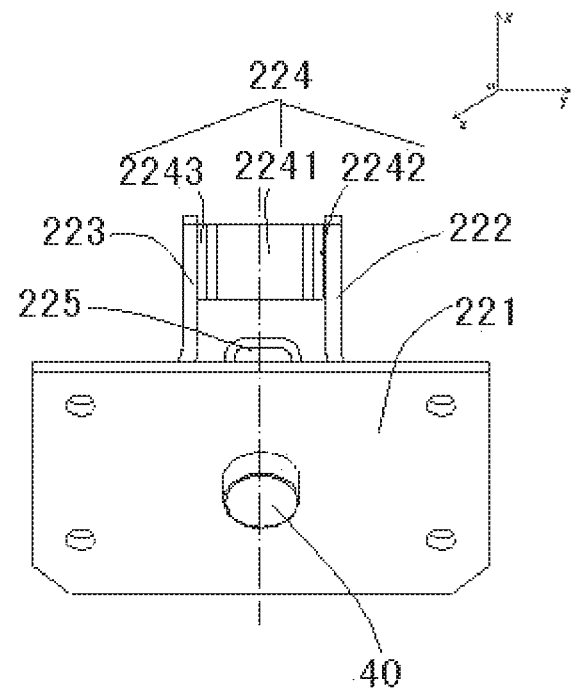
FIG. 5 is a front view of a frame connecting base of a protection device for a vehicle chassis according to one embodiment of the present disclosure.
Figure 6:
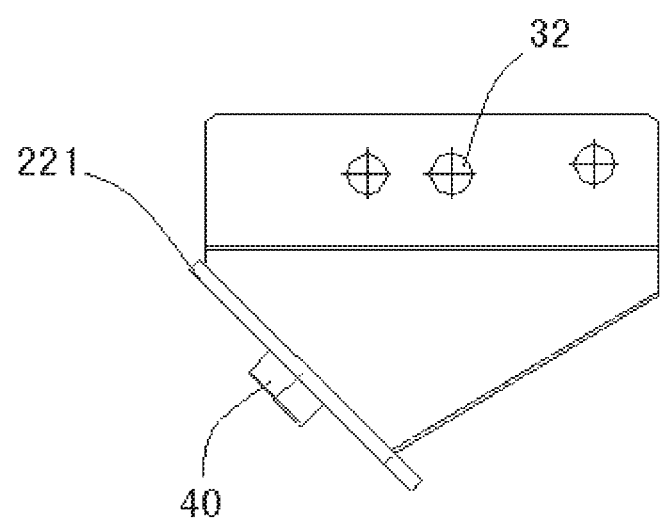
FIG. 6 is a side view of a frame connecting base of a protection device for a vehicle chassis according to one embodiment of the present disclosure.
Figure 7:
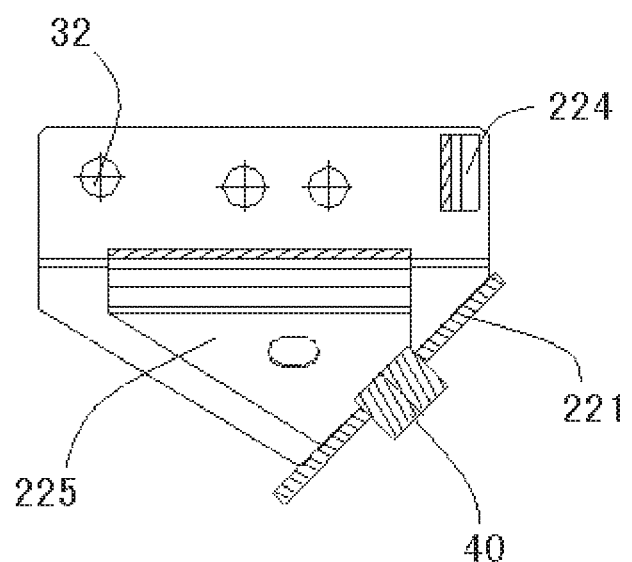
FIG. 7 is a sectional view of a frame connecting base of a protection device for a vehicle chassis according to one embodiment of the present disclosure.

As shown in FIG. 5 to FIG. 7, according to one embodiment of the present disclosure, the front end face of the second flange plate 221 has a protruding positioning pin 40, and the rear end face of the first flange plate 211 is provided with a recessed portion (not shown) matching the positioning pin 40. The positioning pin 40 is provided to position and mount the second flange plate 221 and the first flange plate 211 conveniently, and may also provide shear resistance to secure the connection between the first flange plate 211 and the second flange plate 221, such that the first flange plate 211 and the second flange plate 221 are hardly displaced relative to each other in case of collision.

As shown in FIG. 5 and FIG. 7, according to one embodiment of the present disclosure, the connecting plate 224 may include a body portion 2241, a left flanging 2242 and a right flanging 2243. The left flanging 2242 is bent backwards and connected to the left side plate 222, while the right flanging 2243 is bent backwards and connected to the right side plate 223. For example, the left flanging 2242 is welded to the left side plate 222, and the right flanging 2243 is welded to the right side plate 223. Therefore, the frame connecting base 22 under stress can effectively transfer external forces to the frame connecting plate 300 through the connecting plate 224.

As shown in FIG. 5 and FIG. 7, according to the embodiment of the present disclosure, the bearing member 225 may have a U-shaped cross section, and an opening end of the bearing member 225 is connected to the rear end face of the second flange plate 221. Therefore, materials for manufacturing the bearing member 225 can be reduced to save the manufacturing cost, at the same time of bearing upward and downward forces by the bearing member 225.

Figure 4:
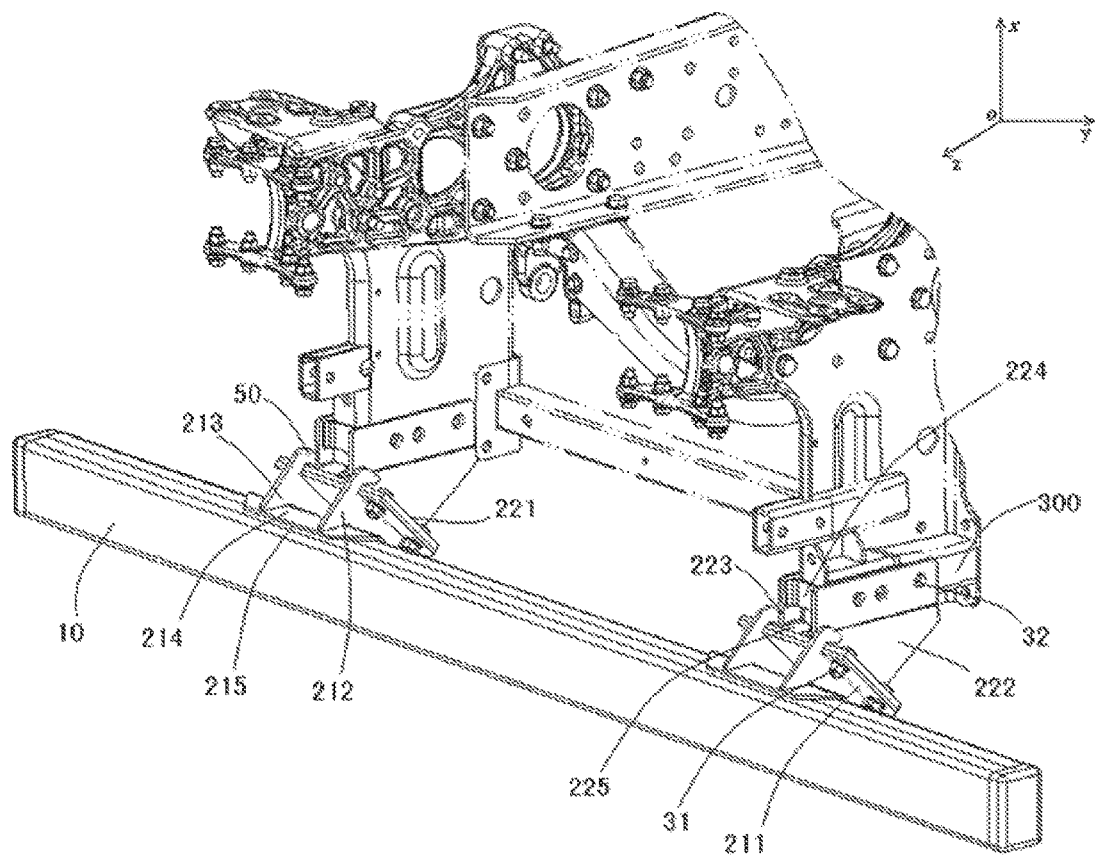
FIG. 4 is a schematic view of connection of a frame and a protection device for a vehicle chassis according to one embodiment of the present disclosure.

As shown in FIG. 4, according to one embodiment of the present disclosure, the beam connecting base 21 may further include a left upright plate 212, a right upright plate 213 and a reinforcing grooved plate 214. The left upright plate 212 and the right upright plate 213 are spaced apart and disposed to the front end face of the first flange plate 211, and the left upright plate 212 and the right upright plate 213 are perpendicular to the front end face of the first flange plate 211. A rear end of the grooved plate 214 is connected to the left upright plate 212 and the right upright plate 213, and a front end of the grooved plate 214 is provided with a mounting groove 215 for mounting the beam 10. The beam 10 may be welded in the mounting groove 215, thus improving the bearing capacity of the beam 10.

As shown in FIG. 4, according to one embodiment of the present disclosure, a plurality of base assemblies 20 may be provided to facilitate transferring the force imposed on the beam 10 to the base assemblies 20 and the frame connecting plate 300.

As shown in FIG. 4, according to one embodiment of the present disclosure, a hook 50 is provided at respective upper ends of the left upright plate 212 and the right upright plate 213, and configured to match an upper end of the second flange plate 221. During assembling, a beam connecting base 21 is hung at the upper end of the second flange plate 221 through the hook 50, and then the first flange plate 211 and the second flange plate 221 are fastened through the bolt 31, thus facilitating the assembling. Furthermore, according to one embodiment of the present disclosure, both of the left upright plate 212 and the right upright plate 213 are provided with at least two hooks 50.

Figure 8:
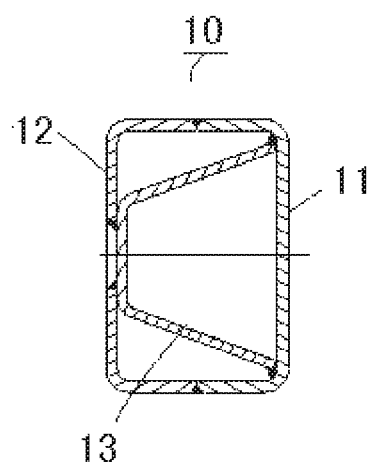
FIG. 8 is a sectional view of a beam of a protection device for a vehicle chassis according to one embodiment of the present disclosure.

As shown in FIG. 8, according to one embodiment of the present disclosure, the beam 10 may include a first channel steel 11, a second channel steel 12 and a third channel steel 13.

Specifically, an opening of the first channel steel 11 is welded to an opening of the second channel steel 12 in a corresponding way. An opening end of the third channel steel 13 is welded to an internal bottom wall of the first channel steel 11, and an external bottom wall of the third channel steel 13 is welded to an internal bottom wall of the second channel steel 12, thus forming a complete high-strength rectangular steel pipe. Furthermore, an opening of the third channel steel 13 gradually enlarges upwards from a bottom portion. In the process of manufacturing the beam 10, the external bottom wall of the third channel steel 13 may be welded to the second channel steel 12 firstly, then the opening of the first channel steel 11 is welded to the opening of the second channel steel 12 correspondingly, and the first channel steel 11 is welded to the opening end of the third channel steel 13 at last. For example, the first channel steel 11 is welded to the opening end of the third channel steel 13 by plug welding.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Different embodiments or examples described in this specification may be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A protection device for a vehicle chassis, comprising a beam; and a base assembly, comprising
a beam connecting base connected to the beam and comprising a first flange plate obliquely disposed to a rear side of the beam; and
a frame connecting base, comprising:
a second flange plate, wherein a front end face of the second flange plate abuts against a rear end face of the first flange plate, and the second flange plate is connected to the first flange plate through a bolt;
a left side plate and a right side plate, wherein the left side plate and the right side plate are spaced apart and disposed to a rear end face of the second flange plate and in perpendicular to the rear end face of the second flange plate, and respectively provided with a corresponding mounting hole;

a connecting plate arranged close to front ends of the left side plate and the right side plate, wherein a left end of the connecting plate is connected to the left side plate, and a right end of the connecting plate is connected to the right side plate; and a bearing member provided to the rear end face of the second flange plate and located between the left side plate and the right side plate.

2. The protection device according to claim 1, wherein the front end face of the second flange plate has a protruding positioning pin, and the rear end face of the first flange plate is provided with a recessed portion matching the positioning pin.

3. The protection device according to claim 1, wherein the connecting plate comprises:

a body portion; and a left flanging and a right flanging, wherein the left flanging is bent backwards and connected to the left side plate, and the right flanging is bent backwards and connected to the right side plate.

4. The protection device according to claim 1, wherein the bearing member has a U-shaped cross section, and an opening end connected to the rear end face of the second flange plate.

5. The protection device according to claim 1, wherein the beam connecting base further comprises:

a left upright plate and a right upright plate spaced apart from each other, and disposed to a front end face of the first flange plate and in perpendicular to the front end face of the first flange plate; and a reinforcing grooved plate, wherein a rear end of the grooved plate is connected to the left upright plate and the right upright plate, and a front end of the grooved plate is provided with a mounting groove for mounting the beam.

6. The protection device according to claim 1, wherein a plurality of base assemblies are provided.

7. The protection device according to claim 1, wherein a hook is provided at respective upper ends of the left upright plate and the right upright plate and configured to match an upper end of the second flange plate.

8. The protection device according to claim 7, wherein the left upright plate and the right upright plate are both provided with at least two hooks.

9. The protection device according to claim 1, wherein the beam comprises:

a first channel steel;

a second channel steel; and a third channel steel;

wherein an opening of the first channel steel corresponds to and is welded to an opening of the second channel steel, an opening end of the third channel steel is welded to an internal bottom wall of the first channel steel, and an external bottom wall of the third channel steel is welded to an internal bottom wall of the second channel steel.

10. The protection device for the vehicle chassis according to claim 9, wherein an opening of the third channel steel gradually enlarges upwards from a bottom portion thereof.

* * * * *